(12) United States Patent
Hinman et al.

(10) Patent No.: US 9,954,857 B2
(45) Date of Patent: Apr. 24, 2018

(54) DIGITAL CHARMS SYSTEM AND METHOD

(71) Applicant: Intel Corporation, Santa Clara, CA (US)

(72) Inventors: Rachel Hinman, Mountain View, CA (US); Aleksander Magi, Aloha, OR (US); Glen J. Anderson, Beaverton, OR (US); Ana Rosario, San Francisco, CA (US); Ryan Scott Brotman, Beaverton, OR (US); Cory J. Booth, Beaverton, OR (US); Giuseppe Raffa, Portland, OR (US); Jamie Sherman, Portland, OR (US); Philip A. Muse, Folsom, CA (US); Jonathan J. Huang, Pleasanton, CA (US); Deepak Vembar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/357,389

(22) PCT Filed: Dec. 19, 2013

(86) PCT No.: PCT/US2013/076537
§ 371 (c)(1),
(2) Date: May 9, 2014

(87) PCT Pub. No.: WO2015/094280
PCT Pub. Date: Jun. 25, 2015

(65) Prior Publication Data
US 2016/0323271 A1    Nov. 3, 2016

(51) Int. Cl.
*H04W 12/08* (2009.01)
*H04L 29/06* (2006.01)
(Continued)

(52) U.S. Cl.
CPC .... *H04L 63/0853* (2013.01); *G06K 19/07762* (2013.01); *G06Q 30/02* (2013.01); *H04L 63/105* (2013.01); *H04W 12/08* (2013.01)

(58) Field of Classification Search
CPC ................................. G06K 19/07762
See application file for complete search history.

(56) References Cited

U.S. PATENT DOCUMENTS 6,307,471 B1 * 10/2001 Xydis ................ G07C 9/00111
340/539.1
8,595,810 B1 * 11/2013 Ben Ayed ........... H04L 63/0815
713/168
(Continued)

FOREIGN PATENT DOCUMENTS

WO    WO-2015094280 A1    6/2015

OTHER PUBLICATIONS

Disney, "Clickables™ Fairy Friendship Bracelet", 2008, a manual.*
(Continued)

*Primary Examiner* — Farid Homayounmehr
*Assistant Examiner* — Zhimei Zhu
(74) *Attorney, Agent, or Firm* — Schwegman Lundberg & Woessner, P.A.

(57) ABSTRACT

A system and method for controlling access to a digital asset. A first host device is provided to a first host device owner and rights are determined to a digital asset. A digital charm is selected, wherein selecting includes granting to the digital charm certain rights to the digital asset. The digital charm is attached to the first host device to form a charm system, wherein attaching includes conferring, to the first host device owner, the rights to the digital asset that were granted to the digital charm.

20 Claims, 6 Drawing Sheets

(51) Int. Cl.
 *G06K 19/077* (2006.01)
 *G06Q 30/02* (2012.01)

(56) References Cited

U.S. PATENT DOCUMENTS

| | | | |
|---|---|---|---|
| 2003/0024975 A1 | 2/2003 | Rajasekharan | |
| 2005/0093868 A1* | 5/2005 | Hinckley | G06F 3/011 345/502 |
| 2006/0058018 A1 | 3/2006 | Toulis et al. | |
| 2007/0124503 A1* | 5/2007 | Ramos | G06F 3/017 709/248 |
| 2007/0178938 A1* | 8/2007 | Kravitz | H04M 3/387 455/558 |
| 2011/0010289 A1* | 1/2011 | Kranzley | G06Q 20/10 705/39 |
| 2011/0191823 A1* | 8/2011 | Huibers | H04W 4/00 726/3 |
| 2012/0150613 A1 | 6/2012 | Insolia et al. | |
| 2013/0169550 A1* | 7/2013 | Gai | G06F 3/041 345/173 |
| 2013/0173658 A1* | 7/2013 | Adelman | G06K 19/0723 707/769 |
| 2013/0268766 A1* | 10/2013 | Schrecker | G06F 21/34 713/185 |
| 2013/0332353 A1 | 12/2013 | Aidasani et al. | |
| 2014/0039337 A1* | 2/2014 | Kampman | A61B 5/0022 600/523 |
| 2014/0149859 A1* | 5/2014 | Van Dyken | H04L 29/08117 715/702 |
| 2014/0370806 A1* | 12/2014 | Atkinson | G06K 19/0717 455/41.1 |
| 2015/0070134 A1* | 3/2015 | Nagisetty | G07C 9/00111 340/5.61 |
| 2015/0074800 A1* | 3/2015 | Farraro | G06F 21/35 726/20 |
| 2015/0081544 A1* | 3/2015 | Schulz | G06Q 20/40145 705/44 |
| 2015/0189403 A1* | 7/2015 | Magi | H04Q 9/00 340/870.07 |

OTHER PUBLICATIONS

Jennifer Van Grove, "Now You Can Bump iOS Devices to Share Music", Nov. 13, 2010, published by mashable.com, obtained from https://web.archive.org/web/20101113233059/http://mashable.com/2010/11/12/bump-music-sharing/, retrieved on Apr. 25, 2017.*

"International Application Serial No. PCT/US2013/076537, International Preliminary Report on Patentability dated Jun. 30, 2016", 11 pgs.

"International Application Serial No. PCT/US2013/076537, International Search Report dated Sep. 18, 2014", 3 pgs.

"International Application Serial No. PCT/US2013/076537, Written Opinion dated Sep. 18, 2014", 9 pgs.

Kikin-Gil, Ruth, "BuddyBeads: Mediating social relationship through mobile communication", Interaction Design Institute Ivrea 2005, (2005), 50 pgs.

Kikin-Gil, Ruth, "Thesis investigation", [Online]. Retrieved from the Internet: <URL: http://www.ruthkikin.com/thesis5.html>, (Last Updated: Mar. 30, 2005), 2 pgs.

* cited by examiner

DIGITAL CHARMS SYSTEM AND METHOD

This application is a National Stage Application under 35 U.S.C 371 from International Application No. PCT/US2013/076537 filed on Dec. 19, 2013, which is hereby incorporated by reference in its entirety.

BACKGROUND ART

With the advent of smart watches, fitness trackers and exercise monitors, wearable digital devices are becoming ubiquitous. They are usually limited to particular functions and applications, and lacking in fashion sense.

BRIEF DESCRIPTION OF THE DRAWINGS

Embodiments are illustrated by way of example, and not by way of limitation, in the figures of the accompanying drawings in which like reference numerals refer to similar elements.

DESCRIPTION OF THE EMBODIMENTS

Many of the wrist-based wearable devices on the market are for fitness, but over time low power technologies will allow decorative and fashionable digital devices and displays. One reason charm bracelets are popular is that they allow wearers to customize the appearance of their jewelry with symbols that have personal meaning and that express individuality. The application of technology to charm bracelets could allow highly flexible and advanced usage while still keeping the meaning and expression behind charms.

Figure 1:
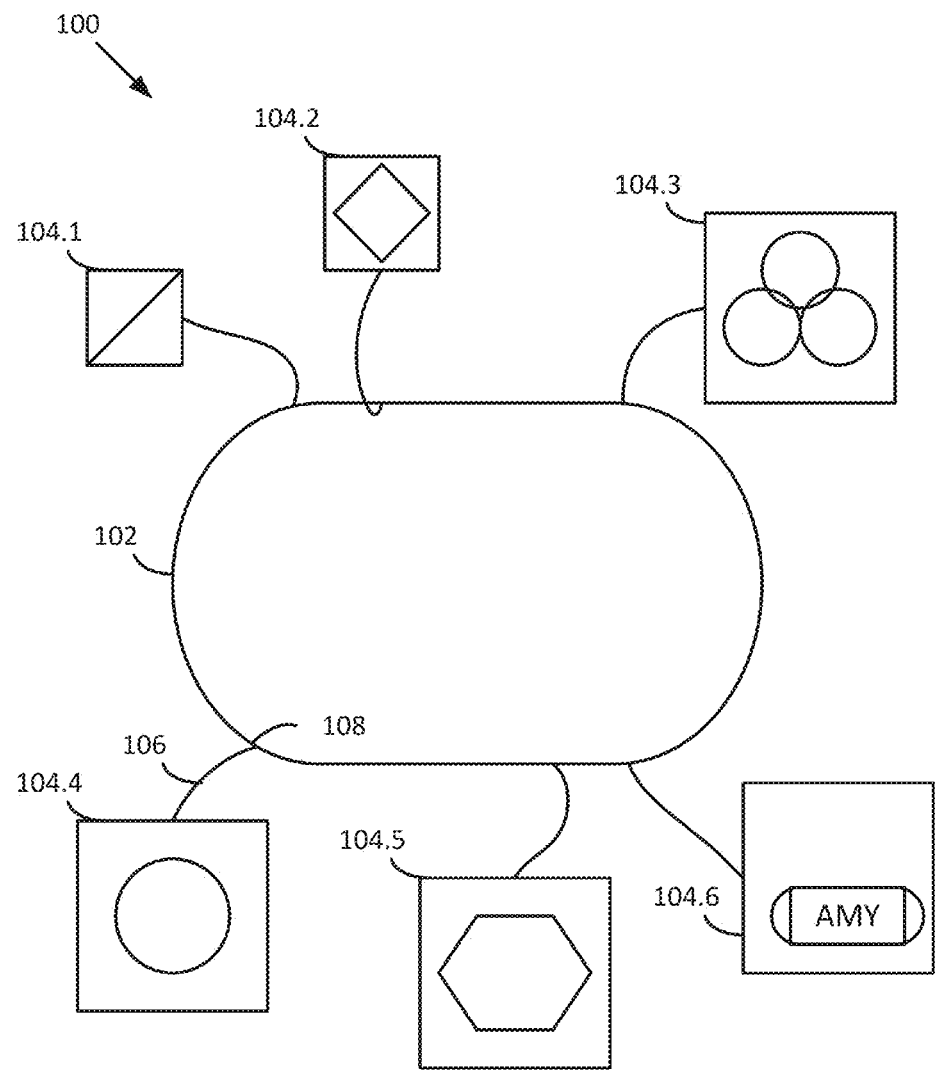
FIG. 1 illustrates a charm system.

An example charm system 100 is shown in FIG. 1. In the example shown in FIG. 1, charm system 100 includes a host device 102 and one or more charms 104. In one embodiment, charms 104 include a signature while host device 102 includes a band with a signature reader capable of receiving the signature from each attached charm 104. In other embodiments, host device 102 is a pin, a brooch, earrings, or other such wearable device.

In this document, the term "charm bracelet" or "bracelet device" is used to represent any host device 102 to which charms 104 may be associated either wired, wirelessly or through other sensed physical contact.

In one example embodiment, individual charms for wearable devices act as a sort of digital tether to other people, applications, or information sources. This tether allows new usages. In one such embodiment, a charm has a digital or analog signature that may be detected by the wearable device, allowing the charm to link to people, applications, or information sources.

In one embodiment, each charm 104.1-104.6 is connected through an attachment mechanism 106 to an attachment point 108 on band 102.

In one embodiment, bracelet 102 provides power to and receives information from charms 104 through attachment mechanism 106 and attachment point 108. In one such embodiment, charm 104 provides a digital code identifying the charm 104. In other embodiments, charm 104 includes a processor and memory and is capable of more sophisticated communication with host device 102 through attachment points 108. In some such embodiments, charm 104 includes a display that displays images provided by the processors.

In some such embodiments, a conductive surface on the charm 104 is used to communicate electrical patterns to a controller on host device 102 when the charm is in contact with host device 102.

In one embodiment, each charm 104 includes a code identifying the type of charm 104. In other embodiments, each charm 104 includes a unique code. In some embodiments, the code associated with a particular charm 104 is a combination of the identifier code on the charm 104 and a user code assigned to the wearer of charm system 100. In another embodiment, the code associated with a particular charm 104 is a combination of the identifier code on the charm 104 and a code assigned to the host device 102. In yet another embodiment, the code associated with a particular charm 104 is a combination of the identifier code on the charm 104 and of a person other than the wearer of charm system 100. In some such embodiments, the other person is the wearer of a different charm system 100. In other such embodiments, the other person is one identified through a digital artifact, or through a digital identity (such as an account on, for example, Facebook).

In some embodiments, host device 102 senses a physical parameter of charm 104 and determines its identification code as a function of the sensed physical parameter. In one such embodiment, each charm includes an embedded impedance that may be sensed by host device 102 by sending a current through the impedance. The impedance sensed indicates the type of charm 104.

In some embodiments, each charm 104 includes a radio. In some such embodiments, the radio is used to communicate with the device 102, or with other nearby charms. Protocols such as zigbee or ant may be used to reduce the power requirements. In some embodiments, each charm 104 communicates with a network interface, a computer or smart phone via a protocol such as Bluetooth. In some such embodiments, each charm 104 communicates with the computer or smart phone to transfer its identifier code and any other relevant information depending on its assigned function.

Charm 104 may have a number of functions:

1) In some embodiments, charm 104 is designed to be given as a gift. The giver purchases the charm and associates it with some digital asset or digital connection before giving it to the recipient. Once the recipient connects the charm to her/his charm system 100, the recipient would then have access to the associated digital asset. Even if not a gift, a charm 104 may be paired with another charm 104 that another user wears, enabling a digital connection. The digital asset or connection could be many things. In one embodiment, the pairing of charms 104 between users could, for example, establish a unique digital connection via a special IM address that allows an exchange just between the two wearers.

2) In some embodiments, charm 104 responds to some action or physical state of the giver, even when the giver is remote, so that the recipient could see it. For example, the charm may light up when the giver squeezes a corresponding charm 104, or other actuator. In one such embodiment, the charm 104 lights up when the recipient and giver are within a specified distance of each other.

3) In some embodiments, one or more charms 104 on a host device 102 operate differently after the wearer moves close to a second host device 102, or after the wearers of the two host devices 102 shake hands or touch host devices 102 or charms 104, signifying that the wearers have been together recently.

4) In other embodiments, charm 104 changes behavior after being in the vicinity of another charm 104 or of another host device 102 without being touched by an object that emanates an electrical signal.

5) In one embodiment, touching two charms 104 to each other passes a digital message between/among host devices 102.

6) In one embodiment, the order of charms on the surface of the host devices 102 effects how communications (or other alerts related to the charm) are prioritized—e.g., a charm that connects to a particularly important person in the wearer's life is at the top, and the position enables messages from this individual to be prioritized or to cause an alert when messages from others do not. Also, the way in which charms are grouped may affect how communications are grouped.

7) In some embodiments, charms 104 are capable of being paired with alerts or other output in various modalities. For example, connecting a given charm to a host device 102 may cause a particular sound or haptic output to emit from the host device 102 when digital events occur that correspond to that charm. For example, a charm 104 may correlate to a Twitter feed and cause a buzz whenever a new Tweet came out from that source.

8) In some embodiments, a charm 104 lights up when the wearer has a limited time to respond. For example, a remote person may squeeze a corresponding charm 104 to see if another person was available. If no response came within a given amount of time, the light would go off without leaving a record of contact.

9) In some embodiments, charms 104 may have different functions—and those functions may be customized on the fly—based on sensed data, context and other digital information coming from the vicinity of the wearer, the Internet of Things or, generically, the cloud. In some embodiments, charms equipped with different sensors provide information to the device 102, or to other charms 104. In one such embodiment, gyroscope sensors are used to improve the accuracy of gesture recognition software. In other embodiments, sensors enable the addition of context information (through, for example, providing GPS information).

10) In some embodiments, a charm 104 serves as a battery for host device 102 and for the other charms 104. In some such embodiments, wireless conduction is used to charge the charms. In other such embodiments, charging is performed through a wired connection.

Figure 2:
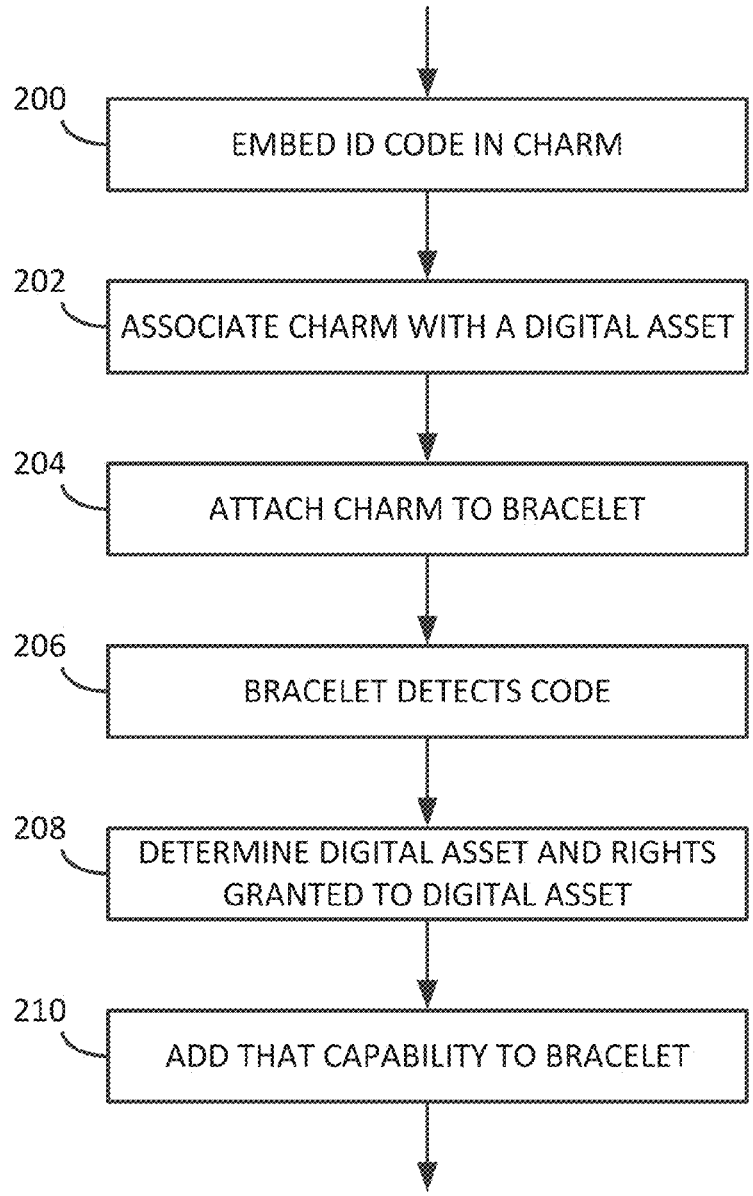
FIG. 2 illustrates a method of associating a digital right with a charm.

In one embodiment, such as is shown in FIG. 2, an identifier is embedded in charm 104 at 200. As noted above, the identifier may range from a unique code to a range of impedances. The variety of types of charms 104 depends to some degree on the resolution of the identifiers.

In some embodiments, a charm 104 is initialized with a unique code written in memory within the charm 104. In one such embodiment, charm 104 includes a plug 106 that tethers the charm to a host device 102 via attachment point 108 (such as a plug receptacle). As noted above, host device 102 may include bracelet devices (or necklace or other such devices). In some such embodiments, a controller within the bracelet device enables the bracelet to access the code within the charm and send that code to the bracelet's operating system. A software (SW) module in the bracelet 102 receives the identifier code and connect to an external database to retrieve the information or desired action (contact, license, app, etc.) that is associated with the code.

Returning to FIG. 2, at 202, a user associates the charm with a digital asset. In one embodiment, this is done by storing an association between the charm identifier and the digital asset in a charm association database. In some such embodiments, the association is accomplished by storing an address associated with the digital asset at a location associated with the charm. In some embodiments, the address stored is an Internet Protocol (IP) address.

In other embodiments, the association is accomplished by storing rights or permissions associated with the digital asset along with the location of the digital asset at a location in the charm association database associated with the charm 104. In other embodiments a digital asset, such as an app, is stored in the charm 104 and accessed by the host device 102 when the charm is plugged into host device 102. In some such embodiments, charm 104 stores several encrypted applications, only one of which the user gets access to, based on the code or codes associated with the charm. In other embodiments, charms 104 work together by using the communication infrastructure made available by device 102, such as a token ring network. In such an embodiment, an app stored on a charm 104 (e.g., a social app) may make use of the identifiers of charms 104 associated with others to, for example, monitor different resources (such as twitter or Facebook).

At 204, the charm is attached to a host device 102. In one embodiment, a charm 104 is initialized with a unique code written in memory within the charm. The charm includes a small cable and plug that tethers the charm to a bracelet device (or necklace or other device) via a port on the bracelet device.

At 206, host device 102 reads the charm identifier from charm 104. In one embodiment, a controller within the bracelet device enables the bracelet to access the code within charm 104 and send that code to the bracelet's operating system.

At 208, host device 102 determines the digital asset and rights granted to charm 104 to access the digital asset. In some embodiments, a software module within device 102 receives the code read from the charm 104 and queries an external database to retrieve information associated with the charm identifier. In some embodiments, the information retrieved is a physical location or network address associated with a digital asset, or a parameter associated with a desired digital connection. In other embodiments, the information retrieved identifies not only the digital asset but the rights granted to the digital asset. The rights might include a license to protected content, contact information or an application that may be downloaded and executed. In some embodiments, the rights are not static. They may vary as a function of, e.g., the proximity of device 102 to the physical location of the digital asset, the proximity of charm 104 to certain other charms 104, the ordering of charms 104 on device 102 or the proximity of device 102 to another host device 102.

For instance, in some embodiments the location of the charm 104 on device 102 provides additional meaning. For example, the placement of the charm connected to a port on the front side of the bracelet may give greater weight to notifications from the contact associated with that charm 104. In one embodiment, a charm 104 associated with a first vendor and a charm associated with a second vendor may be used to provide a joint promotion when placed next to each other on device 102. In some embodiments the charm accepts input from the bracelet 102, such as a password the user needs to enter to access the charm's functionalities.

At 210, those rights are transferred to device 102. In some embodiments, host device 102 inherits the rights granted to the digital charm 104 when the charm is attached to device 102. In some such embodiments, the rights are persistent. That is, they remain within bracelet 102 after the charm 104 is removed from device 102. In other embodiments, the rights end with removal of the charm from device 102, or after a period of time (e.g., when renting a movie).

In one embodiment, a person purchases a digital charm 104 from a vendor. The digital charm includes a link, for example, to a song that may be downloaded. The person who purchased the charm may use the charm, or give it to another person. If he chooses to give the charm away, the recipient attaches the charm to his or her host device 102 and may access the link to download the song. In one embodiment, the rights to the song travel with the charm. That is, if the person detaches the charm from his or her device 102, the song is deleted from the recipient's system. In other embodiments a charm 104 provides access to a playlist or a music service.

In some embodiments, each device 102 includes one or more sensors that measure the weight or electrical conductance of attached charms 104 in order to determine a given charm's correlated actions.

In some embodiments, given a limited number of charms 104, a unique code identifying each charm 104 is not needed. In some such embodiments, the weight or conductance of each charm 104 is used to identify its category of digital asset access.

Figure 3:
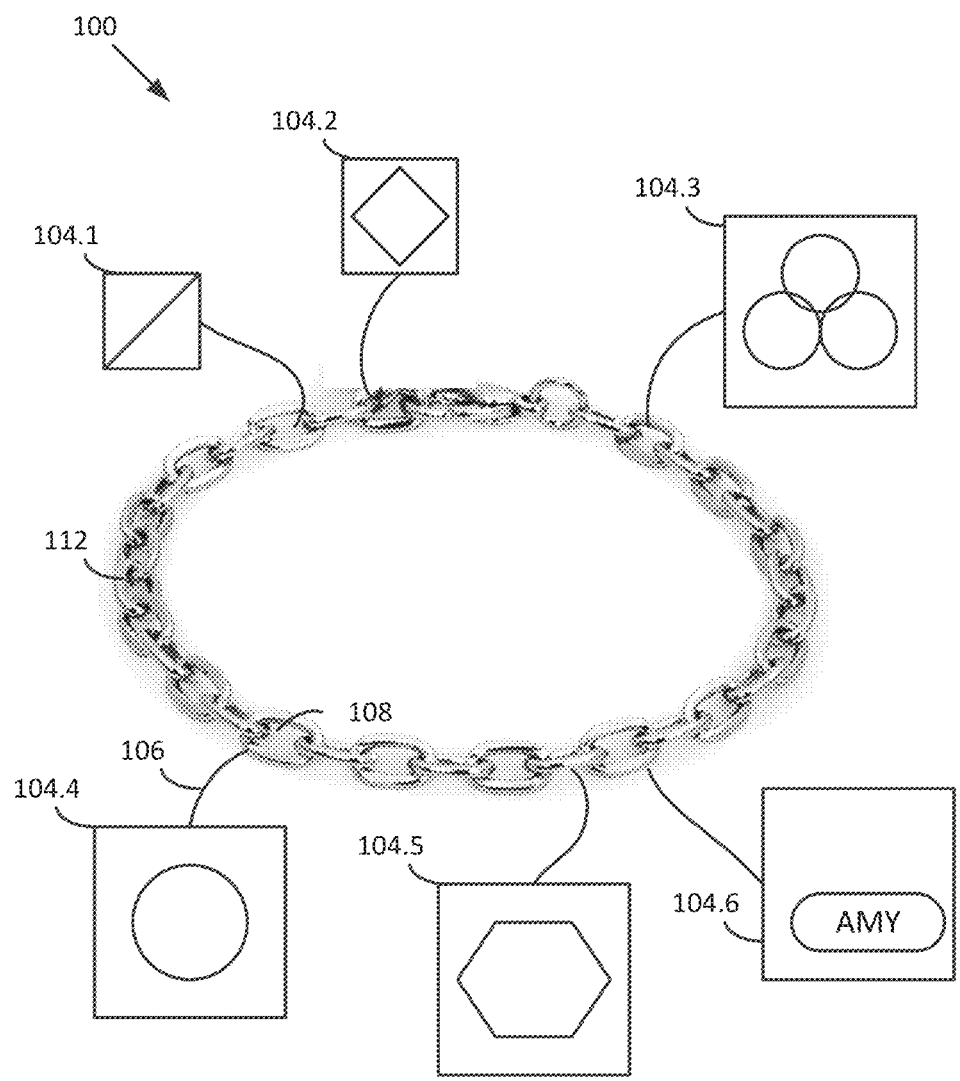
FIG. 3 illustrates another embodiment of a charm system.

In some embodiments, an RFID (radio-frequency identification) or NFC (near field communication) chip in each charm 104 holds the unique code. In some such embodiments, each charm 104 operates independently of the bracelet. That is, all power and communications come from within the charm itself. An example embodiment is shown in FIG. 3. In the example embodiment shown in FIG. 3, bracelet 112 is a passive piece of jewelry used to provide attachment points to charms 104. In some such embodiments, charms 104 are attached to attachment points 108 on bracelet 112 and communicate with a wireless device (such as a computer or smart phone). In some embodiments, the action of connecting the digital charm to bracelet 112 acts to activate the charm (e.g., shorting two leads in attachment mechanism 106).

Once the charm 104 is activated, it queries its surroundings to establish a communications path through the wireless device to, for instance, the charms association database.

In some embodiments, a scanner in host device 102, or in another device, detects the charm in the vicinity of the bracelet device and allows the two to be associated. A confirmation message could appear on a device user interface to allow the user to confirm the association. This would allow charms to have effects on the associated device without having an electrical connection. Simple hooks or latches would keep the charm with the bracelet device. In another embodiment, charms do not have to be attached to a bracelet. That is, charms could be embedded in clothing and could communicate with a central host device 102 and through host device 102, to the Internet.

To enable the usage in which the physical proximity of people, combined with the charms, changes the charm-oriented behavior of the system, a variety of approaches for tracking individuals and their devices could be used. In one embodiment, when people are detected in the same vicinity, the list of charms with each individual would be checked against a database for possible actions.

Figure 4:
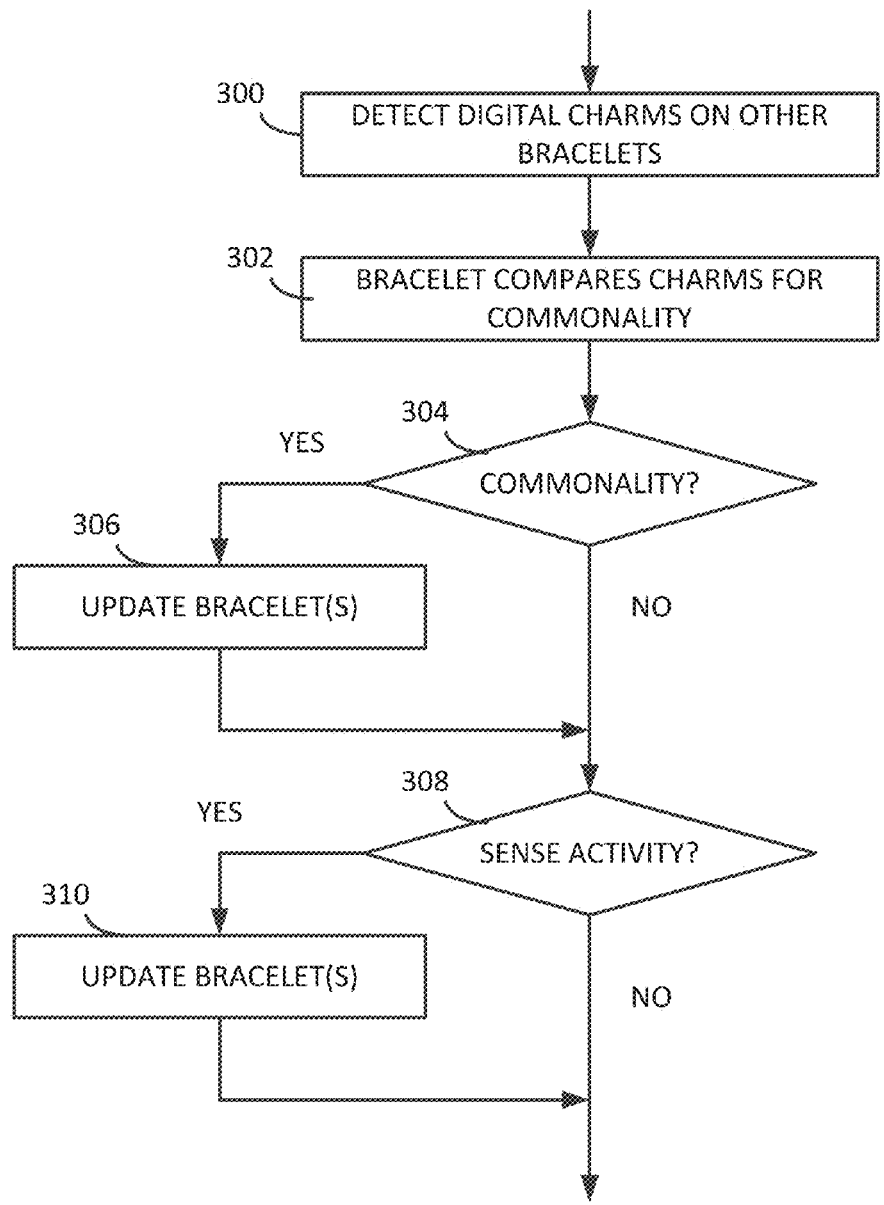
FIG. 4 illustrates a method of adjusting rights granted to a charm as a function of external factors.

In one embodiment, such as is shown in FIG. 4, system 100 senses, at 300, the presence of other devices 102. In some embodiments, this is accomplished by having each device 102 sense other nearby devices 102. In other embodiments, location information for device's 102 is tracked at a remote location and a host device 102 is notified when another is getting close. In yet another embodiment, charms 104 use wireless transmissions to detect nearby charms 104 that are attached to other bracelets 102.

In the example given in FIG. 4, a host device 102 having one or more charms 104 is detected by another host device 102 at 300. In other embodiments, charms 104 detect charms attached to other host devices 102, or the other host devices 102 themselves, as needed. The host device 102 queries the charm association database at 302 to see if any of the charms attached to the second host device 102 will modify any rights or capabilities granted to host device 102 should be modified, control moves to 308.

If, however, at 304, it is determined no rights or capabilities granted to host device 102 should be modified, control moves to 306 and bracelet 102 is updated with the latest capabilities, before moving to 308.

In some embodiments, behavior could be further altered with sensed activity. In such an embodiment, a check is made at 308 to determine if one or more rights or capabilities granted to host device 102 should be modified by sensed activity. If so, a check is made at 308 to determine if activity has been sensed and, if sensed, control moves to 310. Such a check would occur as long as activity is sensed. In some embodiments, modified rights and capabilities revert to their previous states when activity ceases.

In one example embodiment, if two people with a common charm shook hands or did a "high five," the presence of the charms could mean that the users could have a deeper level of data sharing. This sort of activity detection could be enabled by sensors (e.g., accelerometers and GPS) embedded in the charms, in the bracelet device, in a system with cameras that monitor a given environment, or other approaches.

In some embodiments, individual charms include computing elements to allow them to be more independent devices. In some such embodiments, charms 104 include processors, sensor arrays, power source, memory, etc. This allows charms 104 to directly communicate with other devices, or with other charms 104.

In some such embodiments, a conductive surface on the charm 104 is used to communicate electrical patterns to a controller on host device 102 when the charm is in contact with host device 102.

Figure 5:
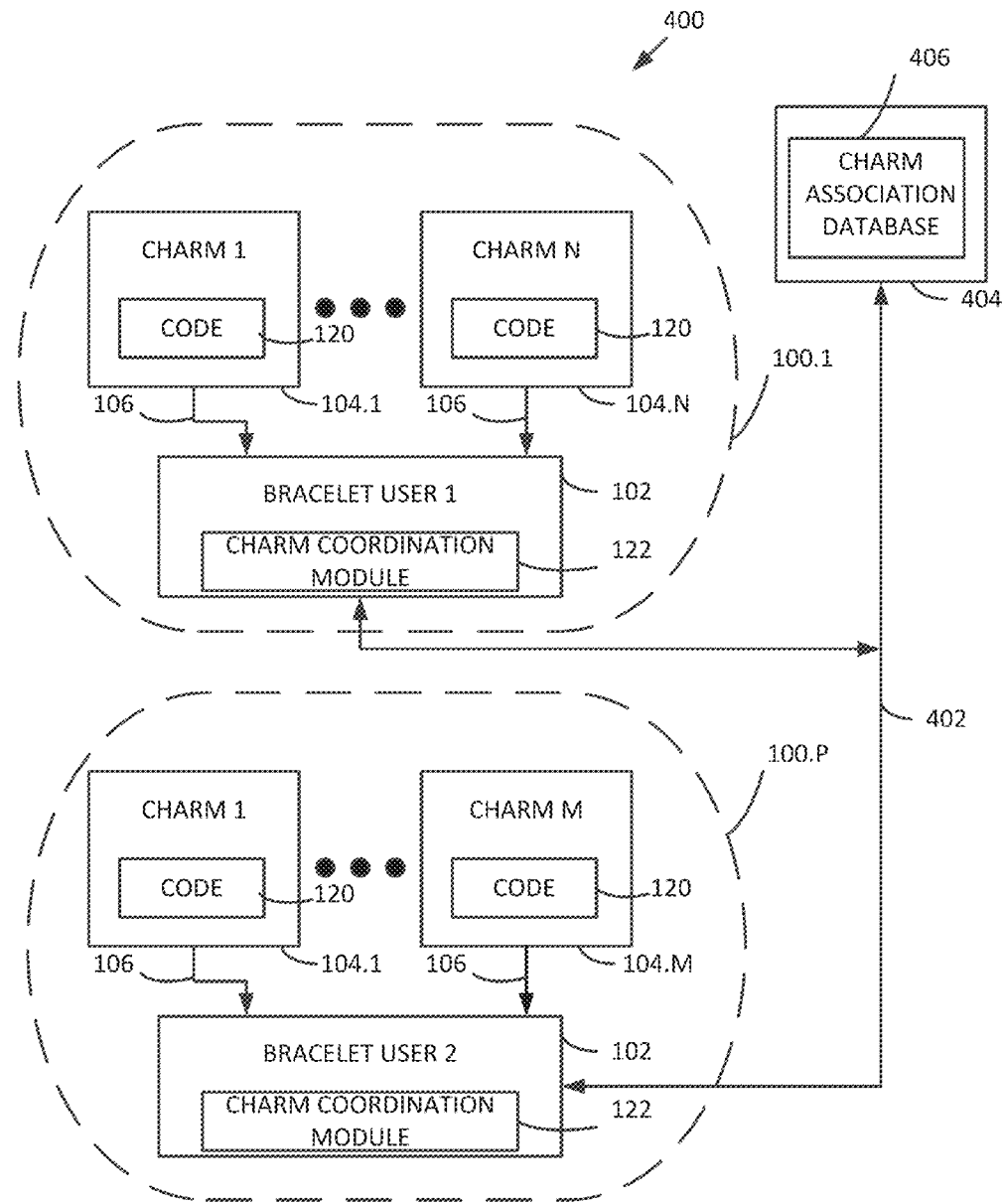
FIG. 5 illustrates a system for storing digital rights as a function of charm identifiers.

FIG. 5 illustrates a digital charm system 400. In the example embodiment shown in FIG. 5, system 400 includes a plurality of charm systems 100 (100.1 through 100.P) connected across a network 402 to a server 404 including a charm association database 406. Each charm system 100 includes a plurality of digital charms 104 (104.1 through 104.N in system 100.1 and 104.1 through 104.M in system 100.P) connected through an attachment mechanism 106 to host devices 102. In the embodiment shown in FIG. 5, each host device 102 includes a charm coordination module 122, which operates with charm association database 406 to determine rights granted to each digital charm 104. In some embodiments, rights granted to each digital charm 104 are accessed via an identifier code 120 stored in each digital charm 104.

In one embodiment, charm association database 406 includes information which, when downloaded to the host device 102, enables a new behavior for the host device. The information may include, for example, contact information for another person, a license key that allows access to a service, or a link to an application to be downloaded.

In some embodiments, charm coordination module 122 receives the identifier code from each digital charm 104, accesses the charm association database as a function of the identifier code 120, and sends commands to carry out the desired actions.

Finally, as noted above, in some embodiments, charms 104 and host devices 102 rely on context to determine permitted actions. For example, a charm 104 may be given a specific function based on the context of the wearer, sensed data from the vicinity of the wearer or others nearby, and data gathered from the cloud using the main wearable device as a proxy for a charm.

The digital charms described above offer advantages over the use of hardware tokens:

1) System 400 allows flexible associations with a charm, as determined by the seller of the main device or the charms, or the context in the vicinity of the wearer;

2) Unique associations with the charms may be programmed (even on the fly in a context-aware fashion) to allow a wide variety of digital access and connections: contact information to another person, the automated download of an app that is associated with the charm 104;

3) Wireless approaches (e.g., with RFID or NFC) allow an unpowered charm with no physical connection to enable most of the usages;

4) The order in which charms are placed on host device 102 (e.g., the bracelet) may have meaning; and 5) Proximity of a charm 104 to another detected system 100 or person may be used to change the subsequent behaviors enabled by the charm 104.

Figure 6:
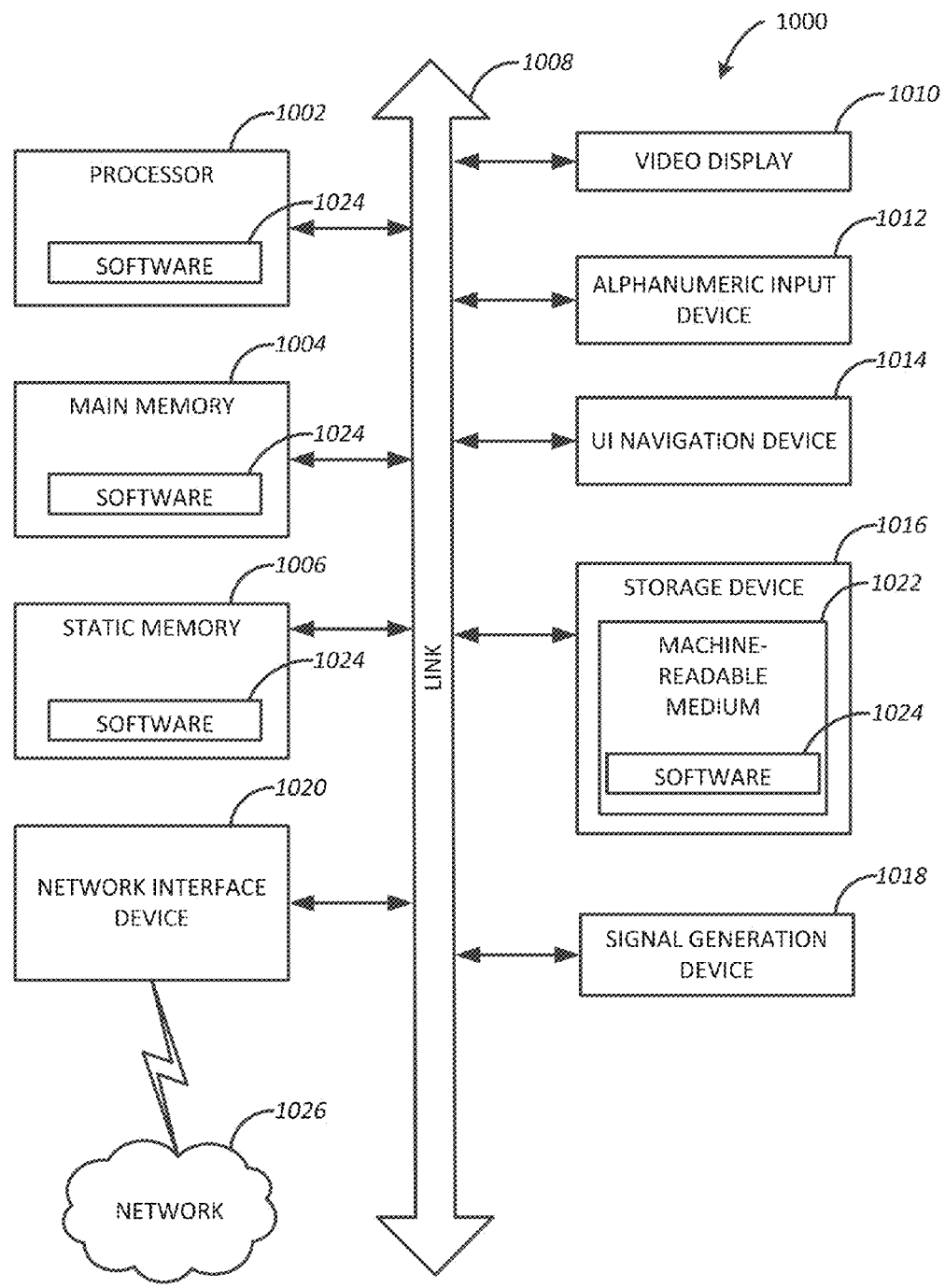
FIG. 6 is a block diagram illustrating an example machine upon which any one or more of the techniques (e.g., methodologies) discussed herein may perform, according to an example embodiment.

FIG. 6 is a block diagram illustrating a machine in the example form of a computer system 1000, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 1000 includes at least one processor 1002 (e.g., a central processing unit (CPU), a graphics processing unit (GPU) or both, processor cores, compute nodes, etc.), a main memory 1004 and a static memory 1006, which communicate with each other via a link 1008 (e.g., bus). The computer system 1000 may further include a video display unit 1010, an alphanumeric input device 1012 (e.g., a keyboard), and a user interface (UI) navigation device 1014 (e.g., a mouse). In one embodiment, the video display unit 1010, input device 1012 and UI navigation device 1014 are incorporated into a touch screen display. The computer system 1000 may additionally include a storage device 1016 (e.g., a drive unit), a signal generation device 1018 (e.g., a speaker), a network interface device 1020, and one or more sensors (not shown), such as a global positioning system (GPS) sensor, compass, accelerometer, or other sensor.

The storage device 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004, static memory 1006, and/or within the processor 1002 during execution thereof by the computer system 1000, with the main memory 1004, static memory 1006, and the processor 1002 also constituting machine-readable media.

While the machine-readable medium 1022 is illustrated in an example embodiment to be a single medium, the term "machine-readable medium" may include a single medium or multiple media (e.g., a centralized or distributed database, and/or associated caches and servers) that store the one or more instructions 1024. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1024 may further be transmitted or received over a communications network 1026 using a transmission medium via the network interface device 1020 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 includes a system, comprising a charm association database; a plurality of wearable host devices, wherein each wearable host device is connected to the charm association database by a network; and a plurality of charms; wherein each charm includes an identifier code and an attachment mechanism; and wherein, when attached via the attachment mechanism, each charm and its corresponding wearable host device form a charm system, wherein the charm system queries the charm association database to determine digital assets associated with the attached charms and rights granted through the charms to the charm system to access those digital assets.

In Example 2, the subject matter of Example 1 may optionally include, wherein the rights granted through the charms to their charm system vary as a function of other charms attached to the same host device.

In Example 3, the subject matter of either of Examples 1 or 2 may optionally include, wherein the digital asset exists external to the digital charm and wherein the rights granted vary as a function of proximity of the charm system to the digital asset.

In Example 4, the subject matter of either of Examples 1 or 2 may optionally include, wherein the digital asset exists external to the digital charm and wherein the rights granted vary as a function of proximity of the charm system to the digital asset, wherein access increases as the charm system approaches the digital asset and then remains at the access level of the closest approach.

In Example 5, the subject matter of either of Examples 1 or 2 may optionally include, wherein the digital asset exists external to the digital charm and wherein the rights granted vary as a function of proximity of the charm system to the digital asset and of proximity of the selected digital charm to other digital charms on the host device.

In Example 6, the subject matter of Example 1 may optionally include, wherein the digital asset exists external to the digital charm, wherein the host device includes other digital charms and wherein the rights granted vary as a function of proximity of the digital charm to the digital asset and of an ordering of the digital charms on the host device.

Example 7 includes a wearable charm device, comprising, a wearable host device with one or more attachment points; and one or more charms, wherein each charm includes an attachment mechanism; wherein the attachment mechanism attaches to the host device through the attachment points; and wherein each charm includes an identifier, wherein each identifier identifies digital assets associated with the charm and rights granted to the charm to access those digital assets.

In Example 8, the subject matter of Example 7 may optionally include, wherein the host device is a bracelet.

In Example 9, the subject matter of either of Examples 7 or 8 may optionally include, wherein the digital charm detects activity on the part of the first host device owner.

In Example 10, the subject matter of either of Examples 7 or 8 may optionally include, wherein the digital charm detects activity on the part of another host device owner.

In Example 11, the subject matter of either of Examples 7 or 8 may optionally include, wherein the rights to the digital asset change when certain other digital charms are attached to the same host device and wherein parameters of that change are stored associated with the charm identifier in a charm association database.

In Example 12, the subject matter of Example 11 may optionally include, wherein the change is a function of an ordering of digital charms on the host device.

Example 13 includes subject matter (such as a device, apparatus, or machine) for controlling access to a digital asset, comprising providing a first host device to a first host device owner, determining rights to a digital asset, selecting a digital charm, wherein selecting includes granting to the digital charm certain rights to the digital asset, and attaching the digital charm to the first host device to form a charm system, wherein attaching includes conferring, to the first host device owner, the rights to the digital asset that were granted to the digital charm.

In Example 14, the subject matter of Example 13 may optionally include, wherein selecting the digital charm further includes transferring the digital charm from an acquirer to the first host device owner, wherein the digital charm, when attached to the first host device, detects activity by the acquirer.

In Example 15, the subject matter of Example 13 may optionally include, accessing the digital asset as a function of the rights granted to the digital charm.

In Example 16, the subject matter of Example 15 may optionally include, wherein granting rights to a digital asset to the digital charm includes determining a charm identifier associated with the digital charm and associating the charm identifier with the digital asset and the rights to the digital asset.

In Example 17, the subject matter of Example 16 may optionally include, wherein associating the charm identifier with the digital asset includes storing the association in a charm association database.

In Example 18, the subject matter of Example 17 may optionally include, wherein attaching the digital charm to the first host device includes reading the charm identifier from the digital charm and querying a charm association database to determine rights granted to the digital charm.

In Example 19, the subject matter of Example 17 may optionally include, wherein attaching the digital charm to the first host device includes reading the charm identifier from the digital charm and querying a charm association database to determine an address to a digital asset and rights to that digital asset granted to the digital charm.

In Example 20, the subject matter Example 18 may optionally include, wherein the digital asset exists at a physical location external to the digital charm and wherein the rights to the digital asset change as a function of proximity to the physical location.

In Example 21, the subject matter of Example 20 may optionally include, wherein accessing includes reading parameters of that change that are stored associated with the charm identifier in the charm association database.

In Example 22, the subject matter of Example 15 may optionally include, wherein accessing the digital asset includes detecting proximity to other charm systems and reacting to physical interactions between the first host device owner and wearers of other charm systems.

In Example 23, the subject matter of Example 13 may optionally include, wherein the digital asset exists external to the digital charm and wherein accessing the digital asset includes querying a database of digital assets.

In Example 24, the subject matter of Example 23 may optionally include, wherein the digital asset includes a sensor and wherein accessing the digital asset includes accessing the sensor.

In Example 25, the subject matter of any one of Examples 13-24 can be stored as instructions on a machine-readable medium, wherein the instructions include instructions for controlling access to a digital asset and wherein, when the instructions are executed by a machine, they cause the machine to perform the method of any one of Examples 13-24.

In Example 26, the subject matter of Example 13 may optionally include, wherein the digital asset exists external to the digital charm and wherein the rights granted vary as a function of proximity of the charm system to the digital asset.

In Example 27, the subject matter of Example 13 may optionally include, wherein the digital asset exists external to the digital charm and wherein the rights granted vary as a function of proximity of the charm system to the digital asset, wherein access increases as the charm system approaches the digital asset and then remains at the access level of the closest approach.

In Example 28, the subject matter of Example 13 may optionally include, wherein the digital asset exists external to the digital charm and wherein the rights granted vary as a function of proximity of the charm system to the digital asset and of proximity of the selected digital charm to other digital charms on the host device.

In Example 29, the subject matter of Example 13 may optionally include, wherein the digital asset exists external to the digital charm, wherein the host device includes other digital charms and wherein the rights granted vary as a function of proximity of the digital charm to the digital asset and of an ordering of the digital charms on the host device.

In Example 30, the subject matter of Example 13 may optionally include, wherein the digital charm detects activity on the part of the first host device owner.

In Example 31, the subject matter of Example 13 may optionally include, wherein the digital charm detects activity on the part of another host device owner.

In Example 32, the subject matter of Example 13 may optionally include, wherein selecting the digital charm further includes transferring the digital charm from an acquirer to the first host device owner, wherein the digital charm, when attached to the first host device, detects activity by the acquirer.

In Example 33, the subject matter of Example 13 may optionally include, accessing the digital asset as a function of the rights granted to the digital charm.

In Example 34, the subject matter of Example 33 may optionally include, wherein granting rights to a digital asset to the digital charm includes determining a charm identifier associated with the digital charm and associating the charm identifier with the digital asset and the rights to the digital asset.

In Example 35, the subject matter of Example 34 may optionally include, wherein associating the charm identifier with the digital asset includes storing the association in a charm association database.

In Example 36, the subject matter of Example 34 may optionally include, wherein attaching the digital charm to the first host device includes reading the charm identifier from the digital charm and querying a charm association database to determine rights granted to the digital charm.

In Example 37, the subject matter of Example 34 may optionally include, wherein attaching the digital charm to the first host device includes reading the charm identifier from the digital charm and querying a charm association database to determine an address to a digital asset and rights to that digital asset granted to the digital charm.

In Example 38, the subject matter of any one of Examples 36 or 37 may optionally include, wherein the digital asset exists at a physical location external to the digital charm and wherein the rights to the digital asset change as a function of proximity to the physical location.

In Example 39, the subject matter of Example 38 may optionally include, wherein accessing includes reading parameters of that change that are stored associated with the charm identifier in the charm association database.

In Example 40, the subject matter of Example 38 may optionally include, wherein the rights to the digital asset change when selected other digital charms are attached to the same host device and wherein parameters of that change are stored associated with the charm identifier in the charm association database.

In Example 41, the subject matter of Example 40 may optionally include, wherein the change is a function of an ordering of digital charms on the host device.

In Example 42, the subject matter of Example 35 may optionally include, wherein accessing the digital asset includes detecting proximity to other charm systems and reacting to physical interactions between the first host device owner and wearers of other charm systems.

In Example 43, the subject matter of Example 36 may optionally include, wherein the digital asset exists external to the digital charm and wherein accessing the digital asset includes querying a database of digital assets.

In Example 44, the subject matter of Example 43 may optionally include, wherein the digital asset includes a sensor and wherein accessing the digital asset includes accessing the sensor.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A wearable charm device, comprising:
   a wearable host device with one or more attachment points; and
   one or more charms;
   wherein each charm includes an attachment mechanism;
   wherein the attachment mechanism attaches to the host device through the attachment points;
   wherein each charm includes an identifier;
   wherein each identifier identifies digital assets associated with the charm and rights granted to the charm to access those digital assets;
   wherein a charm of the one or more charms is configured to:
      detect a gesture performed by a user of the host device and another host device user; and
      set a data sharing level based on the gesture performed;
   wherein the rights granted vary based on proximity of the wearable host device to a physical location of the digital asset,
   wherein the granted rights associated with the charm have an associated persistence upon the removal of the charm from the wearable charm device, and wherein the wearable charm device is configured to enable the rights granted to either permanently persist or persist for a defined period of time after the charm is removed from the wearable charm device based on the associated persistence.

2. The wearable charm device of claim 1, wherein the rights to the digital asset change when certain other digital charms are attached to the same host device and wherein parameters of that change are stored associated with the charm identifier in a charm association database.

3. The wearable charm device of claim 2, wherein the change is a function of an ordering of digital charms on the host device.

4. The wearable charm device of claim 1, wherein the wearable charm device, when in operation, is communicatively coupled to a database having a list of individuals and at least one action associated a first individual, wherein behavior of the charm associated with the digital assets and rights granted to the charm to access those digital assets is altered based on physical proximity to the first individual, and wherein the behavior is determined by the at least one action.

5. The wearable charm device of claim 1, wherein the identifier is a unique code derived from at least one of:
   (a) a combination of an identifier code on the charm and a user code assigned to the user wearing the charm device,
   (b) a combination of the identifier code on the charm and a code assigned to the wearable host device,
   (c) a combination of the identifier code on the charm and of a person other than the user wearing the charm system, wherein the person is one of wearing a different charm device or the person is identified through a digital artifact, or digital identity,
   (d) a function of a sensed physical parameter of the charm, or
   (e) a function of an impendence embedded in the charm.

6. The wearable charm device of claim 1, wherein the charm has an associated function, and wherein the charm is configured to dynamically customize the associated function based on at least one of sensed data, contextual information, and environmental information related to a vicinity of the user.

7. A method of controlling access to a digital asset, comprising:
   detecting, at a wearable charm device, a gesture performed by a user of the wearable charm device with another user of a second wearable charm device, the wearable charm devices including respective wearable host devices attached to respective digital charms; and
   granting rights to the digital asset based on the gesture, wherein each digital charm includes an identifier to identify digital assets associated with the digital charm and rights granted to the digital charm to access those digital assets,
   wherein the rights granted vary based on proximity of the wearable charm device to a physical location of the digital asset,
   wherein the granted rights associated with the digital charm have an associated persistence upon the removal of the digital charm from the wearable charm device, and wherein the wearable charm device is configured to enable the rights granted to either permanently persist or persist for a defined period of time after the digital charm is removed from the wearable charm device, based on the associated persistence.

8. The method of claim 7, wherein the wearable charm device and the second wearable charm device include sensors embedded in the respective digital charms to detect the gesture.

9. The method of claim 7, wherein detecting the gesture comprises receiving an indication of the gesture from an environmental monitoring system.

10. The method of claim 7, wherein the detecting of the gesture further comprises receiving an indication of the gesture by the wearable charm device, from an environmental monitoring system, the environmental monitoring system including a camera system to capture the gesture performed by the user and the other user, and communicate the indication of the gesture to the wearable charm device.

11. The method of claim 7, wherein granting rights comprises granting a deeper level of data sharing between the wearable charm device and the second wearable charm device.

12. The method of claim 7, wherein the digital asset comprises data.

13. At least one non-transitory machine readable medium for controlling access to a digital asset including instructions, which when executed by a wearable charm device, cause the wearable charm device to:
   detect a gesture performed by a user of the wearable charm device with another user of a second wearable charm device, the wearable charm devices including respective wearable host devices attached to respective digital charms; and
   grant rights to the digital asset based on the gesture, wherein each digital charm includes an identifier to identify digital assets associated with the digital charm and rights granted to the digital charm to access those digital assets, wherein the granted rights are dynamically assigned based at least on proximity of the wearable charm device to a physical location of the digital asset, wherein the granted rights associated with the digital charm have an associated persistence upon the removal of the digital charm from the wearable charm device, and wherein the wearable charm device is configured to enable the rights granted to either permanently persist or persist for a defined period of time after the digital charm is removed from the wearable charm device, based on the associated persistence.

14. The at least one non-transitory machine readable medium of claim 13, wherein the gesture comprises a handshaking gesture between the user and the other user.

15. The at least one non-transitory machine readable medium of claim 13, wherein the gesture comprises a "high five" gesture between the user and the other user.

16. The at least one non-transitory machine readable medium of claim 13, wherein the wearable charm device and the second wearable charm device include sensors embedded in the respective digital charms to detect the gesture.

17. The at least one non-transitory machine readable medium of claim 13, wherein detecting the gesture comprises receiving an indication of the gesture from an environmental monitoring system.

18. The at least one non-transitory machine readable medium of claim 13, wherein instructions to detect the gesture further comprises instructions to receive indication of the gesture by the wearable charm device, from an environmental monitoring system including a camera system to capture the gesture performed by the user and the other user, and communicate the indication of the gesture to the wearable charm device.

19. The at least one non-transitory machine readable medium of claim 13, wherein granting rights comprises granting a deeper level of data sharing between the wearable charm device and the second wearable charm device.

20. The at least one non-transitory machine readable medium of claim 13, wherein the digital asset comprises data.

\* \* \* \* \*